(12) United States Patent
Yu et al.

(10) Patent No.: US 6,684,971 B2
(45) Date of Patent: Feb. 3, 2004

(54) INTELLIGENT ELECTRIC BICYCLE AUTOMATICALLY OPERABLE IN DIFFERENT MODES

(75) Inventors: Tung-Shiang Yu, Taipei (TW); Ian Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/144,293

(22) Filed: May 13, 2002

(65) Prior Publication Data

US 2003/0159870 A1 Aug. 28, 2003

(51) Int. Cl.[7] ............................................. B62M 23/02
(52) U.S. Cl. .................... 180/205; 180/65.1; 180/65.5; 180/206
(58) Field of Search ............................. 180/65.1, 65.2, 180/65.5, 205–207, 220, 230

(56) References Cited

U.S. PATENT DOCUMENTS

| | | | | |
|---|---|---|---|---|
| 5,474,148 A | * | 12/1995 | Takata | 180/206 |
| 5,664,636 A | * | 9/1997 | Ikuma et al. | 180/206 |
| 5,857,537 A | * | 1/1999 | Matsumoto et al. | 180/206 |
| 5,865,267 A | * | 2/1999 | Mayer et al. | 180/205 |
| 6,006,850 A | * | 12/1999 | Yu | 180/220 |
| 6,296,072 B1 | * | 10/2001 | Turner | 180/220 |

* cited by examiner

*Primary Examiner*—Lesley D. Morris
*Assistant Examiner*—L. Lum
(74) *Attorney, Agent, or Firm*—Harness, Dickey & Pierce, P.L.C.

(57) ABSTRACT

An intelligent electric bicycle includes a pedal drive unit, a power assist unit, a tread detector for detecting treading action on the pedal drive unit, a throttle unit for controlling output power of the power assist unit, a speed sensor, and a controller coupled electrically to the power assist unit, the tread detector, the throttle unit and the speed sensor. The controller operates in one of a user-controlled power distribution mode, an automatic drive mode and a cruise control mode according to the detected states of the pedal drive unit and the throttle unit and the moving speed of the bicycle.

4 Claims, 3 Drawing Sheets

INTELLIGENT ELECTRIC BICYCLE AUTOMATICALLY OPERABLE IN DIFFERENT MODES

BACKGROUND OF THE INVENTION

1. Field of the Invention

The invention relates to an electric bicycle, more particularly to an intelligent electric bicycle that is automatically operable in different modes.

2. Description of the Related Art

Bicycles are not only a convenient, low-cost and environmental friendly form of transport, they are also useful for health fitness and recreation. To enhance strength, comfort and functionality of bicycles, many auxiliary devices have been proposed heretofore.

Electric bicycles that permit manual cycling and power-assisted cycling are known in the art. However, conventional electric bicycles require the bicycle rider to continuously actuate the throttle for varying the bicycle moving speed, which is tiring and uncomfortable for the rider especially during long distance cycling.

SUMMARY OF THE INVENTION

Therefore, the object of the present invention is to provide an intelligent electric bicycle that is automatically operable in different modes for enhanced convenience, comfort and functionality.

Accordingly, the electric bicycle of this invention includes a pedal drive unit manually operable for driving forward movement of the bicycle, a power assist unit electrically operable for driving the forward movement of the bicycle, a tread detector for detecting treading action on the pedal drive unit, a throttle unit for controlling output power of the power assist unit, a speed sensor for detecting moving speed of the bicycle, and a controller coupled electrically to the power assist unit, the tread detector, the throttle unit and the speed sensor.

In operation, simultaneous treading action on the pedal drive unit and actuation of the throttle unit enable the controller to operate in a user-controlled power distribution mode, in which the output power of the power assist unit is controlled via the throttle unit.

In addition, when the moving speed of the bicycle has reached a predetermined speed setting, actuation of the throttle unit without treading action on the pedal drive unit enables the controller to operate in an automatic drive mode, in which the output power of the power assist unit is controlled via the throttle unit.

Preferably, when the controller operates in the user-controlled power distribution mode, and the throttle unit has been actuated to a current speed setting for a preset time period, the controller switches operation to a first cruise control mode, in which as long as treading action on the pedal drive unit continues, the current speed setting of the throttle unit is maintained without the need for continued actuation of the throttle unit.

Preferably, when the controller operates in the automatic drive mode, and the throttle unit has been actuated to a current speed setting for a preset time period, the controller switches operation to a second cruise control mode, in which as long as there is no treading action on the pedal drive unit, the current speed setting of the throttle unit is maintained without the need for continued actuation of the throttle unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
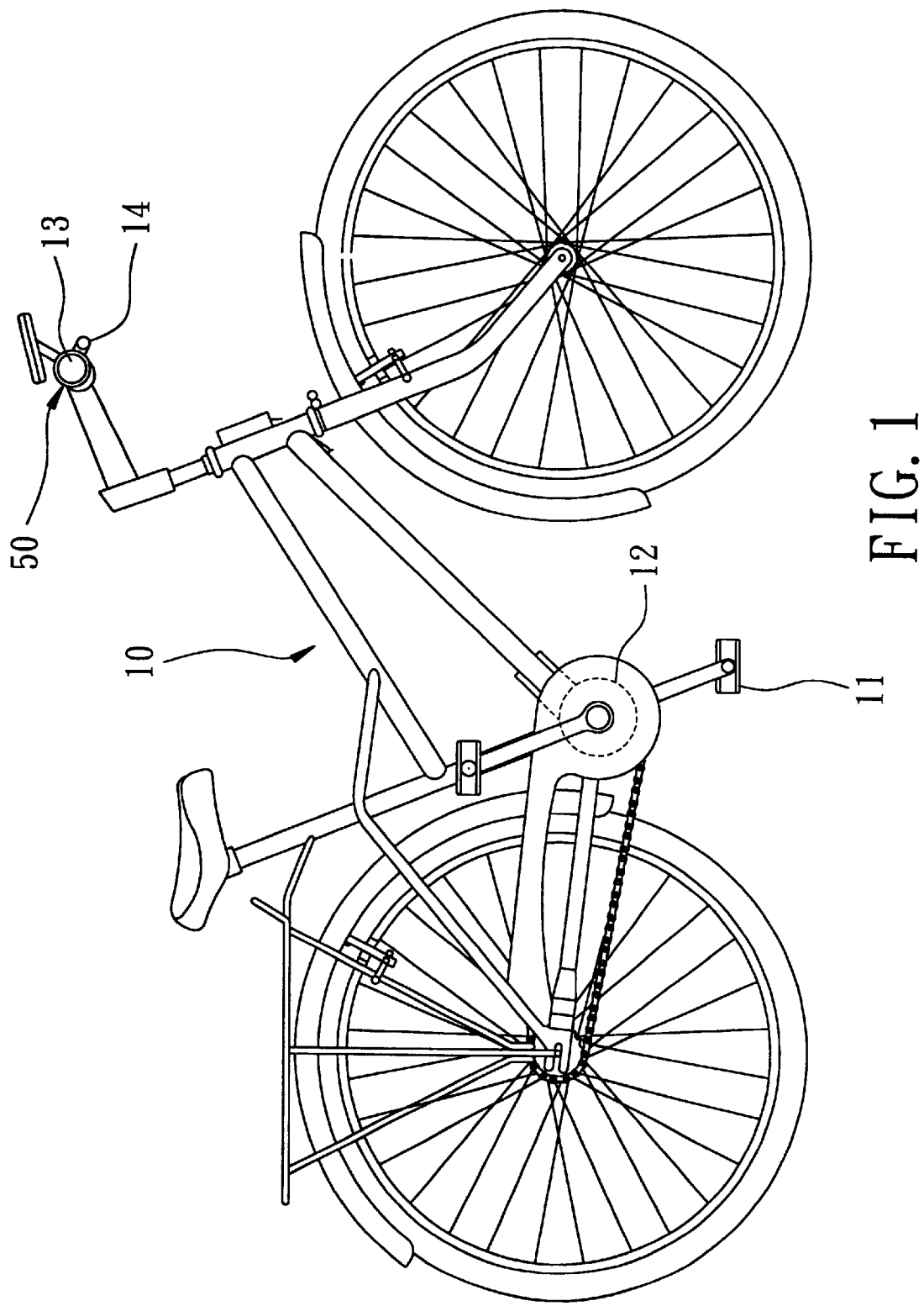
FIG. 1 is a schematic side view of the preferred embodiment of an intelligent electric bicycle according to the present invention.
Figure 2:
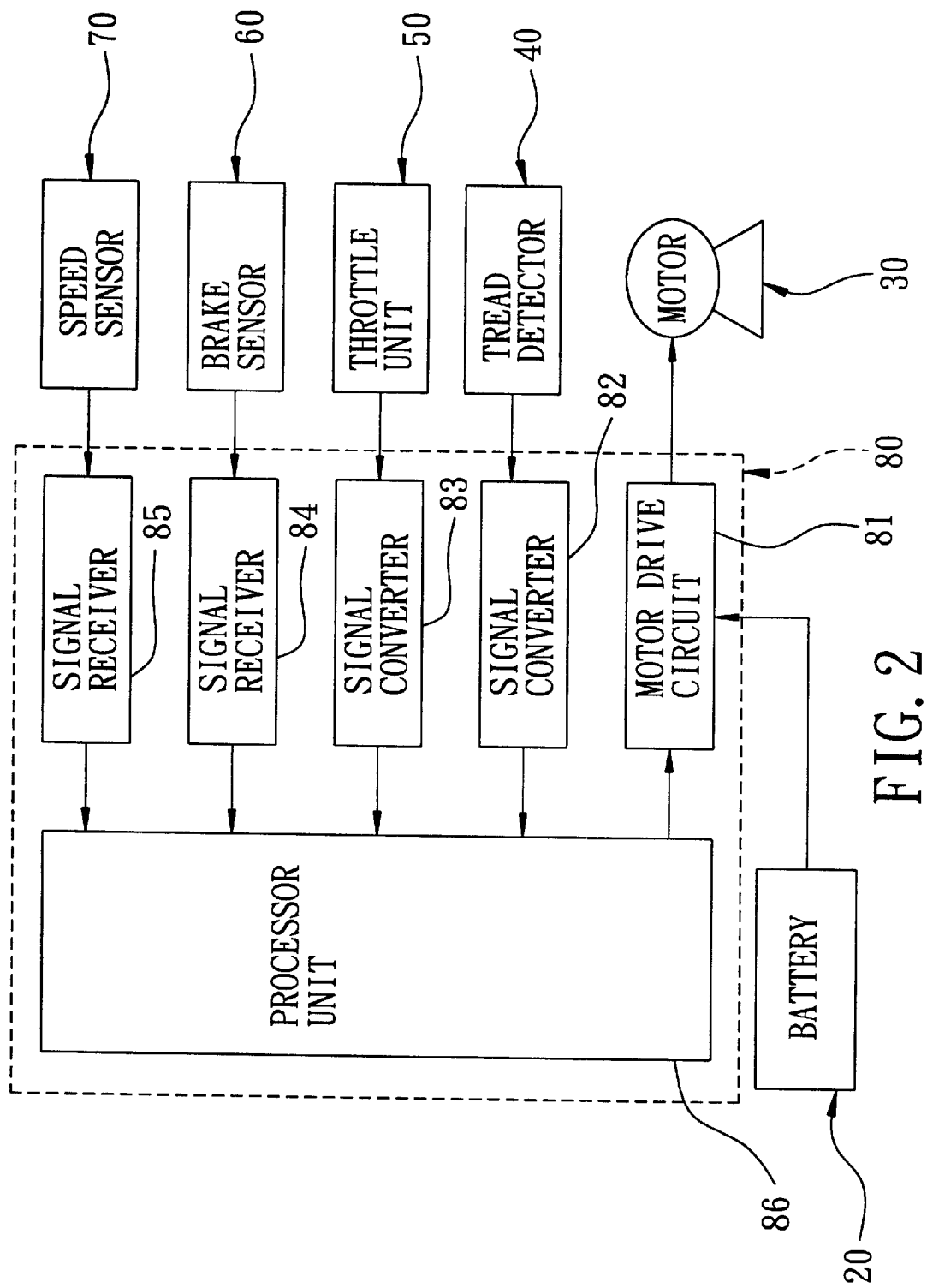
FIG. 2 is a schematic circuit block diagram of the preferred embodiment.

Referring to FIGS. 1 and 2, the preferred embodiment of an intelligent electric bicycle 10 according to the present invention is shown to comprise a pedal drive unit 11 manually operable for driving forward movement of the bicycle 10, a power assist unit 12 including a motor 30 that is electrically operable for driving the forward movement of the bicycle 10, a handlebar unit 13 for controlling moving direction of the bicycle 10, a brake unit 14 for braking the bicycle 10, a battery 20 for supplying electric power, a tread detector 40 for detecting treading action on the pedal drive unit 11, a throttle unit 50 mounted on the handlebar unit 13 and operable so as to control output power of the motor 30 of the power assist unit 12, a brake sensor 60 for sensing braking action of the bicycle 10, a speed sensor 70 for detecting moving speed of the bicycle 10, and a controller 80 connected to the battery 20, the motor 30, the tread detector 40, the throttle unit 50, the brake sensor 60, and the speed sensor 70.

The controller 80 includes a motor drive circuit 81, a pair of signal converters 82 and 83, a pair of signal receivers 84 and 85, and a processor unit 86 connected to the motor drive circuit 81, the signal converters 82, 83, and the signal receivers 84, 85.

The motor drive circuit 81 is connected to the battery 20 and the motor 30, and is controlled by the processor unit 86 to control in turn output power of the motor 30 in a known manner. The signal converter 82 is connected to the tread detector 40, and converts an analog output of the latter into a corresponding digital signal that is supplied to the processor unit 86. The signal converter 83 is connected to the throttle unit 50, and converts an analog output of the latter into a corresponding digital signal that is supplied to the processor unit 86. The signal receiver 84 is connected to the brake sensor 60, and provides a digital output of the latter to the processor unit 86. The signal receiver 85 is connected to the speed sensor 70, and provides a digital output of the latter to the processor unit 86.

Figure 3:
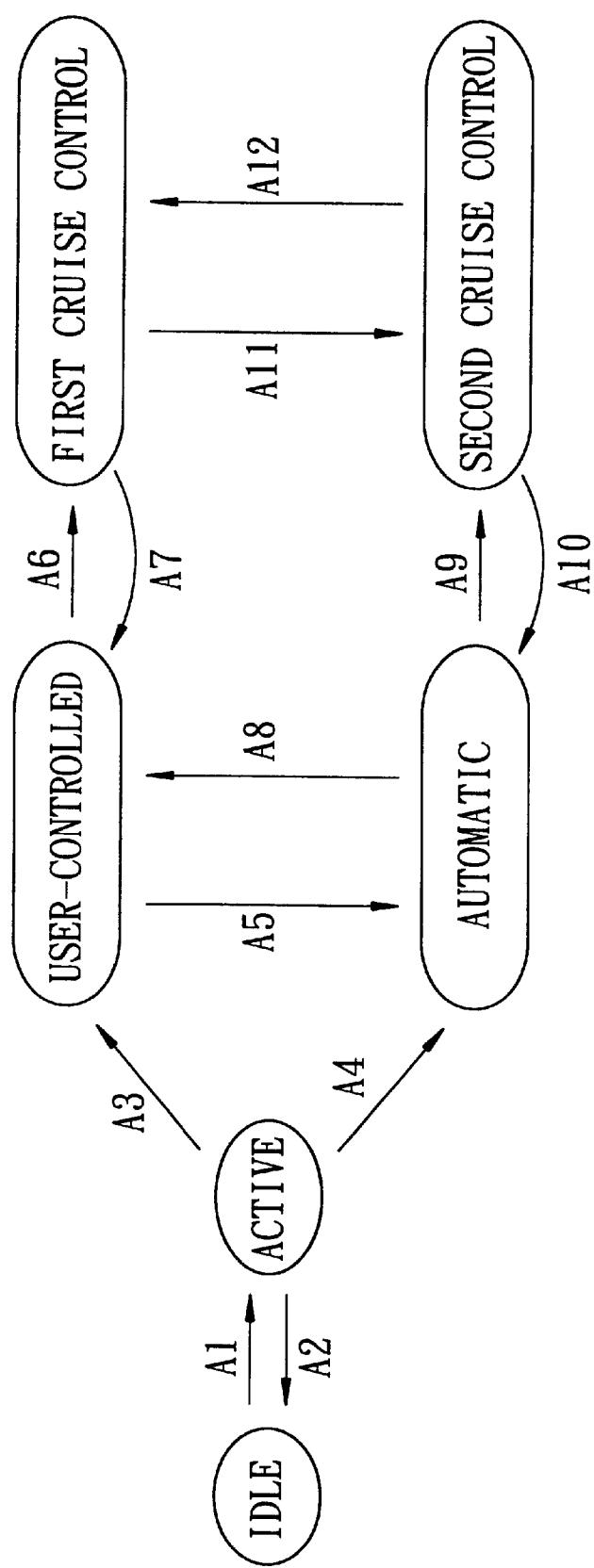
FIG. 3 is a state transition diagram to illustrate the different operating modes of a controller of the preferred embodiment.

With further reference to FIG. 3, initially, the controller 80 of the bicycle 10 is in an idle state. When the rider turns on a power switch (event $A_1$) the operating state of the controller 80 changes to an active state. A change from the active state back to the idle state occurs when the power switch is turned off (event $A_2$).

When the controller 80 is in the active state, simultaneous treading action on the pedal drive unit 11 as detected by the processor unit 86 via the tread detector 40 and the signal converter 82 and actuation of the throttle unit 50 as detected by the processor unit 86 via the signal converter 83 (event $A_3$) causes the controller 80 to operate in a user-controlled power distribution mode, in which the output power of the motor 30 of the power assist unit 12 is controlled by the processor unit 86 through the motor drive circuit 81 according to the actuation of the throttle unit 50.

On the other hand, when the controller 80 is in the active state, upon detection by the processor unit 86 that the moving speed of the bicycle 10 has reached a predetermined speed setting, such as 5 kph, via the speed sensor 70 and the signal receiver 85, actuation of the throttle unit 50 without treading action on the pedal drive unit 11 (event $A_4$) causes the controller 80 to operate in an automatic drive mode, in which the output power of the motor 30 of the power assist unit 12 is controlled by the processor unit 86 through the motor drive circuit 81 according to the actuation of the throttle unit 50.

When the controller 80 operates in the user-controlled power distribution drive mode, upon detection by the processor unit 86 that the treading action on the pedal drive unit 11 has stopped for at least a preset time period (event $A_5$), such as 3 seconds, the controller 80 will operate in the automatic drive mode.

Moreover, when the controller 80 operates in the user-controlled power distribution mode, upon detection by the processor unit 86 that the throttle unit 50 has been actuated to a current speed setting for a preset time period (event $A_6$), such as 6 seconds, the controller 80 switches operation to a first cruise control mode, in which as long as treading action on the pedal drive unit 11 continues, the current speed setting of the throttle unit 50 is maintained without the need for continued actuation of the throttle unit 50.

When the controller 80 operates in the first cruise control mode, upon detection by the processor unit 86 that the throttle unit 50 has been actuated to a selected setting higher than the current speed setting (event $A_7$), the controller 80 switches operation from the first cruise control mode back to the user-controlled power distribution mode.

When the controller 80 operates in the automatic drive mode, upon detection by the processor unit 86 of the presence of a treading action on the pedal drive unit 11 for-at least a preset time period (event $A_8$), such as 3 seconds, the controller 80 switches operation from the automatic drive mode to the user-controlled power distribution mode.

Moreover, when the controller 80 operates in the automatic drive mode, upon detection by the processor unit 86 that the throttle unit 50 has been actuated to a current speed setting for a preset time period (event $A_9$), such as 6 seconds, the controller 80 switches operation to a second cruise control mode, in which as long as there is no treading action on the pedal drive unit 11, the current speed setting of the throttle unit 50 is maintained without the need for continued actuation of the throttle unit 50.

When the controller 80 operates in the second cruise control mode, upon detection by the processor unit 86 that the throttle unit 50 has been actuated to a selected setting higher than the current speed setting (event $A_{10}$), the controller 80 switches operation from the second cruise control mode back to the automatic drive mode.

In the preferred embodiment, a change in the operating mode of the controller 80 from the first cruise control mode to the second cruise control mode is possible upon detection by the processor unit 86 that the treading action on the pedal drive unit 11 has stopped for at least a preset time period (event $A_{11}$) such as 3 seconds. On the other hand, a change in the operating mode of the controller 80 from the second cruise control mode to the first cruise control mode is possible upon detection by the processor unit 86 of the presence of treading action on the pedal drive unit 11 for at least a preset time period (event $A_{12}$), such as 3 seconds.

Preferably, during operation of the controller 80 in any of the user-controlled power distribution mode, the automatic drive mode, the first cruise control mode, and the second cruise control mode, upon detection by the processor unit 86 of a braking action of the bicycle 10 via the brake sensor 60 and the signal receiver 84, the controller 80 switches operation back to the active state.

It has thus been shown that the intelligent electric bicycle of this invention can provide convenience and comfort for the rider during use. Moreover, the ease of use and labor-saving effect will prevent the rider from over-exerting his/her wrists since continuous twisting and turning of the throttle unit as in the case of conventional electric bicycles is not required. The functionality of electric bicycles is also promoted in the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electric bicycle comprising:
    a pedal drive unit manually operable for driving forward movement of the bicycle;
    a power assist unit electrically operable for driving the forward movement of the bicycle;
    a tread detector for detecting treading action on said pedal drive unit;
    a throttle unit for controlling output power of said power assist unit;
    a speed sensor for detecting moving speed of the bicycle; and
    a controller coupled electrically to said power assist unit, said tread detector, said throttle unit and said speed sensor;
    wherein simultaneous treading action on said pedal drive unit and actuation of said throttle unit enable said controller to operate in a user-controlled power distribution mode, in which said output power of said power assist unit is controlled via said throttle unit;
    wherein, when the moving speed of the bicycle has reached a predetermined speed setting, actuation of said throttle unit without treading action on said pedal drive unit enables said controller to operate in an automatic drive mode, in which said output power of said power assist unit is controlled via said throttle unit; and
    wherein, when said controller operates in the user-controlled power distribution mode, and said throttle unit has been actuated to a current speed setting for a preset time period, said controller switches operation to a cruise control mode, in which as long as treading action on said pedal drive unit continues, the current speed setting of said throttle unit is maintained without need for continued actuation of said throttle unit.

2. The electric bicycle of claim 1, wherein said controller switches operation from the cruise control mode back to the user-controlled power distribution mode when said throttle unit is actuated to a selected setting higher than the current speed setting.

3. An electric bicycle comprising:
    a pedal drive unit manually operable for driving forward movement of the bicycle;
    a power assist unit electrically operable for driving the forward movement of the bicycle;

a tread detector for detecting treading action on said pedal drive unit;

a throttle unit for controlling output power of said power assist unit;

a speed sensor for detecting moving speed of the bicycle; and a controller coupled electrically to said power assist unit, said tread detector, said throttle unit and said speed sensor;

wherein simultaneous treading action on said pedal drive unit and actuation of said throttle unit enable said controller to operate in a user-controlled power distribution mode, in which said output power of said power assist unit is controlled via said throttle unit;

wherein, when the moving speed of the bicycle has reached a predetermined speed setting, actuation of said throttle unit without treading action on said pedal drive unit enables said controller to operate in an automatic drive mode, in which said output power of said power assist unit is controlled via said throttle unit; and wherein, when said controller operates in the automatic drive mode, and said throttle unit has been actuated to a current speed setting for a preset time period, said controller switches operation to a cruise control mode, in which as long as there is no treading action on said pedal drive unit, the current speed setting of said throttle unit is maintained without need for continued actuation of said throttle unit.

4. The electric bicycle of claim 3, wherein said controller switches operation from the cruise control mode back to the automatic drive mode when said throttle unit is actuated to a selected speed setting higher than the current speed setting.

* * * * *